(12) United States Patent
Mehr et al.

(10) Patent No.: US 12,540,105 B2
(45) Date of Patent: Feb. 3, 2026

(54) HIGH TEMPERATURE COATINGS

(71) Applicant: Honeywell International Inc., Charlotte, NC (US)

(72) Inventors: Mehrad Mehr, Raleigh, NC (US); Bahram Jadidian, Watchung, NJ (US)

(73) Assignee: Honeywell International Inc., Charlotte, NC (US)

( * ) Notice: Subject to any disclaimer, the term of this patent is extended or adjusted under 35 U.S.C. 154(b) by 1113 days.

(21) Appl. No.: 17/248,760

(22) Filed: Feb. 5, 2021

(65) Prior Publication Data

US 2022/0250996 A1    Aug. 11, 2022

(51) Int. Cl.
| | |
|---|---|
| *B32B 9/00* | (2006.01) |
| *C04B 35/83* | (2006.01) |
| *C04B 41/00* | (2006.01) |
| *C04B 41/45* | (2006.01) |
| *C04B 41/50* | (2006.01) |

(Continued)

(52) U.S. Cl.
CPC ............ *C04B 41/522* (2013.01); *C04B 35/83* (2013.01); *C04B 41/009* (2013.01); *C04B 41/4515* (2013.01); *C04B 41/4517* (2013.01); *C04B 41/4543* (2013.01); *C04B 41/4554* (2013.01); *C04B 41/5025* (2013.01); *C04B 41/5057* (2013.01); *C04B 41/87* (2013.01);
(Continued)

(58) Field of Classification Search
CPC ..... Y10T 428/30; C04B 41/522; C04B 41/83; C04B 41/009; C04B 41/4515; C04B 41/4517; C04B 41/4543; C04B 41/4554; C04B 41/87; C04B 41/89; C04B 2235/422; C04B 2235/5248; C04B 35/83

USPC ...................................... 428/408; 423/447.1
See application file for complete search history.

(56) References Cited

U.S. PATENT DOCUMENTS

| | | | |
|---|---|---|---|
| 4,837,073 | A | 6/1989 | Mcallister et al. |
| 5,536,574 | A | 7/1996 | Carter |

(Continued)

FOREIGN PATENT DOCUMENTS

| | | |
|---|---|---|
| CA | 2086380 A1 | 7/1993 |
| EP | 0428977 A1 | 5/1991 |

(Continued)

OTHER PUBLICATIONS

Extended Search Report from counterpart European Application No. 22151952.3, dated Jul. 6, 2022, 7 pp.

(Continued)

*Primary Examiner* — Daniel H Miller
(74) *Attorney, Agent, or Firm* — Shumaker & Sieffert, P.A.

(57) ABSTRACT

A method includes forming a crystallized metal carbide undercoat on a surface of a carbon-carbon composite substrate. The method further includes forming an overcoat on a surface of the undercoat. The overcoat includes a plurality of crystallized ultra-high melting point overcoat layers. Each overcoat layer is sequentially formed by applying a mixture to a surface of an underlying layer and heating the mixture. The mixture includes a plurality of ultra-high melting point refractory ceramic particles and a pre-ceramic polymer. The mixture is heated to a heat treatment temperature to pyrolyze the pre-ceramic polymer and form the overcoat layer in an inert atmosphere or under vacuum. As a result, the overcoat layer includes a crystallized ultra-high melting point polymer-derived ceramic matrix that includes the plurality of ultra-high melting point refractory ceramic particles.

12 Claims, 3 Drawing Sheets

(51) Int. Cl.
*C04B 41/52* (2006.01)
*C04B 41/87* (2006.01)
*C04B 41/89* (2006.01)

(52) U.S. Cl.
CPC ........ *C04B 41/89* (2013.01); *C04B 2235/422* (2013.01); *C04B 2235/5248* (2013.01)

(56) References Cited

U.S. PATENT DOCUMENTS

| | | |
|---|---|---|
| 5,622,751 A | 4/1997 | Thebault et al. |
| 6,077,607 A | 6/2000 | Zornik |
| 6,537,470 B1 | 3/2003 | Wood et al. |
| 6,555,173 B1 | 4/2003 | Forsythe et al. |
| 6,740,408 B2 | 5/2004 | Thebault et al. |
| 7,172,408 B2 | 2/2007 | Wood et al. |
| 9,259,760 B2 | 2/2016 | Lee et al. |
| 9,296,660 B2 | 3/2016 | Miyamoto et al. |
| 10,302,163 B2 | 5/2019 | Rowe et al. |
| 2003/0194574 A1 | 10/2003 | Thebault et al. |
| 2020/0270182 A1 | 8/2020 | Poteet et al. |

FOREIGN PATENT DOCUMENTS

| | | |
|---|---|---|
| EP | 0818636 A1 | 1/1998 |
| FR | 2838071 A1 | 10/2003 |
| JP | H05229886 A | 9/1993 |
| KR | 20070025829 A | 3/2007 |

OTHER PUBLICATIONS

Bernardo et al., "Advanced Ceramics from Preceramic Polymers Modified at the Nano-Scale: A Review," MDPI, Materials, vol. 7, Mar. 6, 2014, pp. 1927-1956.

Mera et al., "Ceramic Nanocomposites form Tailor-Made Preceramic Polymers," MDPI, Nanomaterials, vol. 5, Apr. 1, 2015 pp. 468-540.

Zhang et al., "Novel Processing of Unique Ceramic-Based Nuclear Materials and Fuels," The Research Foundation of State University of New York, Nov. 30, 2008, 99 pp.

Cuccato, "Polymer-Derived Ceramics for Energy Storage Applications," Kansas State University, College of Engineering and Department of Nuclear Engineering, Dissertation of the Academic Year 2016-2017, (Applicant points put, in accordance with MPEP 609.04(a), that the year of publication, 2016-2017, is sufficiently earlier than the effective U.S. filing date, so that the particular month of publication is not in issue.), 115 pp.

Seyferth, "Preceramic Polymers: Past, Present, and Future," Technical Report No. 37, ACS Advances in Chemistry "Materials Chemistry: An Emerging Subdiscipline," Nov. 2, 1992, 33 pp.

Jin et al., "Advances in oxidation and ablation resistance of high and ultra-high temperature ceramics modified or coated carbon/carbon composites," Elsevier, Journal of the European Ceramic Society, vol. 38, Issue, 1, Aug. 8, 2017, pp. 1-28.

Corral et al., "Ultra-High-Temperature Ceramic Coatings for Oxidation Protection of Carbon-Carbon Composites," The American Ceramic Society, Journal of the American Ceramic Society, vol. 91, No. 5, Jan. 18, 2008, pp. 1495-1502.

Response to Extended Search Report dated Jul. 6, 2022, from counterpart European Application No. 22151952.3 filed Aug. 10, 2022, 57 pp.

Communication pursuant to Article 94(3) EPC from counterpart European Application No. 22151952.3 dated Apr. 3, 2025, 6 pp.

First Office Action and Search Report from counterpart Chinese Application No. 202210108656.X dated May 31, 2025, 12 pp. Translation Attached.

Response to Communication pursuant to Article 94(3) EPC dated Apr. 3, 2025, from counterpart European Application No. 22151952.3 filed Jul. 7, 2025, 3 pp.

HIGH TEMPERATURE COATINGS

TECHNICAL FIELD

The disclosure relates to high temperature coatings.

BACKGROUND

Carbon-carbon (C—C) composites may be used in high temperature applications. For example, the aerospace industry employs C—C composite components as friction materials for commercial and military aircraft, such as brake friction materials. In high temperature applications, C—C composites may be susceptible to oxidation, which may lead to deterioration of physio-mechanical properties.

SUMMARY

The disclosure describes highly configurable coatings for carbon-carbon composite substrates that protect against oxidation at high temperatures, and techniques for making the same. In some examples, the high temperature coatings include a crystallized metal carbide undercoat and an overcoat of two or more overcoat layers. The undercoat may include a metal-rich metal carbide formed in situ on the substrate. Two or more overcoat layers of the overcoat may include ultra-high melting point refractory ceramic particles in a dense, crystallized, polymer-derived ceramic matrix. Each of these overcoat layers may be formed by applying a mixture of the refractory ceramic particles and a pre-ceramic polymer. To form the crystallized ceramic matrix, the mixture may be heated in an inert atmosphere or under vacuum to pyrolyze the pre-ceramic polymer and crystallize the ceramic matrix. Various properties of the composition of the ceramic particles and pre-ceramic polymer and distribution of the ceramic particles in the mixture may be selected to provide a corresponding overcoat layer with particular thermomechanical and thermophysical properties, such as coefficient of thermal expansion, thermal conductivity, porosity, or thermal stability. In this way, a carbon-carbon composite substrate coated with the high temperature coatings described herein may be protected from oxidation, thermal degradation, and/or environmental degradation.

In one example, a method includes forming a crystallized metal carbide undercoat on a surface of a carbon-carbon composite substrate. The method further includes forming an overcoat on a surface of the undercoat. The overcoat includes a plurality of crystallized ultra-high melting point overcoat layers. Each overcoat layer is sequentially formed by applying a mixture to a surface of an underlying layer and heating the mixture. The mixture includes a plurality of ultra-high melting point refractory ceramic particles and a pre-ceramic polymer. The mixture is heated to a heat treatment temperature to pyrolyze the pre-ceramic polymer and form the overcoat layer in an inert atmosphere or under vacuum. As a result, the overcoat layer includes a crystallized ultra-high melting point polymer-derived ceramic matrix that includes the plurality of ultra-high melting point refractory ceramic particles.

In another example, an article includes a carbon-carbon composite substrate, a crystallized metal carbide undercoat on a surface of the carbon-carbon composite substrate, and an overcoat on a surface of the undercoat. The overcoat includes a plurality of crystallized ultra-high melting point overcoat layers. Each of the plurality of overcoat layers includes a crystallized ultra-high melting point polymer-derived ceramic matrix that includes a plurality of ultra-high melting point refractory ceramic particles.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
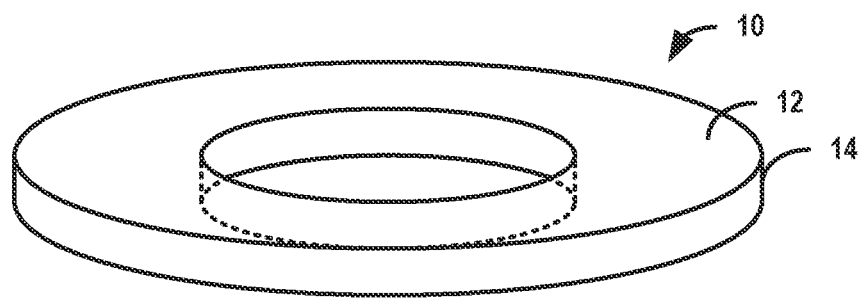
FIG. 1A is a perspective view diagram illustrating an example composite that includes a high temperature coating formed in accordance with the techniques of this disclosure.

The disclosure describes high temperature coatings for carbon-carbon composite articles that include a crystallized metal carbide undercoat and a highly configurable multilayer overcoat for ultra-high temperature (e.g., greater than 1500 degrees Celsius (° C.)) applications. Carbon-carbon composite components may provide good mechanical properties and have low mass density relative to other materials, such as metal alloys. However, at high temperatures, carbon-carbon composite components may be susceptible to oxidation, environmental attack, and degradation of physio-mechanical properties. Refractory ceramic-based antioxidant coatings may improve resistance to oxidation and/or environmental attack at high temperatures experienced in aerospace applications, such as aircraft brakes (e.g., temperatures as high as 1600° C.) or rocket nozzles (e.g., temperatures as high as 2400° C.). Prior to use in an oxidizing atmosphere, high temperature carbon-composite-based substrates may be coated with an antioxidant coating that may reduce oxidation of an external surface of the substrate and reduce ingress of oxidizing species (e.g., air, oxygen, and/or water vapor) into pores of the component.

The high temperature coatings described herein may be formed using a relatively simple, inexpensive process that enables customization of the high temperature coating for particular applications. The high temperature coating includes a crystallized, metal-rich metal carbide undercoat on a surface of the substrate that strongly adheres to an adjacent overcoat and may have self-healing functionality through metal oxides formed in microcracks of the undercoat. The antioxidant coating also includes a crystallized, ultra-high melting point multilayer overcoat. Each overcoat layer may be formed by applying a pre-fired mixture to an outer surface of an underlying layer, such as through relatively routine coating processes (e.g., brush or spray painting). The pre-fired mixture may include ultra-high melting point refractory ceramic particles and a pre-ceramic polymer. After application of the mixture, the mixture may be heated to pyrolyze and crystallize the pre-ceramic polymer into a ceramic matrix. The resulting overcoat layer may be substantially (e.g., greater than 95% by volume) crystallized and free of glass (e.g., less than 5% by volume). In some instances, an outermost surface of the high temperature coatings may form an ultra-high temperature oxide when in operation.

This application and heating process may be repeated to form one or more additional overcoat layers. The pre-fired mixture for each layer may be customized to provide specific and tailored properties to the overcoat through individual overcoat layers and/or a combination of overcoat layers. For example, particle size and distribution, particle composition, pre-ceramic polymer composition, and volume ratio of particles to pre-ceramic polymer for a mixture used to form one or more respective overcoat layers may be selected to provide particular thermomechanical and thermophysical properties to respective overcoat layers and/or the overall overcoat, such as coefficient of thermal expansion, porosity, thermal conductivity, or thermal stability (e.g., melting point). As a result, particular overcoat layers may have improved properties for a particular depth in the overcoat and/or improved properties relative to adjacent layers or coatings. For example, an outermost overcoat layer near a surface of the overcoat may have a higher melting point than underlying overcoat layers that have less exposure to heat, while overcoat layers progressing from the outermost overcoat layer to the undercoat may form a gradient of CTE to reduce mismatch of CTE between adjacent layers or a gradient of decreasing thermal conductivity to reduce heat transfer to the substrate. In this way, high temperature coatings described herein may allow a high degree of tailorability for a particular high temperature application.

Figure 1B:
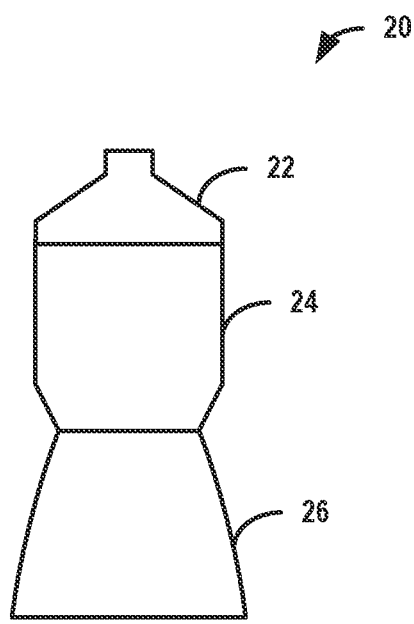
FIG. 1B is a conceptual diagram illustrating an example composite that includes a high temperature coating formed in accordance with the techniques of this disclosure.

High temperature coatings described herein may be used in a variety of high temperature applications. Due to high temperatures experienced by components in high speed, friction, or combustion environments, the high temperature coatings may be particularly suited to aerospace applications. FIGS. 1A and 1B illustrate examples of carbon-carbon composite articles used in aerospace applications that may experience high temperatures conducive to oxidation, and that include high temperature coatings that protect an underlying substrate from oxidation. However, high temperature coatings described herein may be used for other applications, such as leading edges of hypersonic vehicles or missiles.

FIG. 1A is a perspective view diagram illustrating an example carbon-carbon composite 10 that includes a high temperature coating formed in accordance with the techniques of this disclosure. In the example of FIG. 1A, carbon-carbon composite 10 is a brake disc, such as may be used on an aircraft wheel and brake assembly, that may experience relatively high temperatures caused by friction during braking. Carbon-carbon composite 10 includes a carbon-carbon composite substrate that includes one or more friction surfaces 12 and one or more non-friction surfaces 14. For example, a friction surface 12 may generally correspond to surface portions of the substrate that, unlike non-friction surfaces 14, frictionally engages with an opposing brake disc during a braking operation. In the example of FIG. 1A, friction surfaces 12 may correspond to an outer face of an annular ring, and non-friction surfaces 14 may correspond to outer perimeter surface regions and lug regions. To protect the carbon-carbon composite substrate from oxidation, carbon-carbon composite 10 may include a high temperature coating (not shown individually in FIG. 1A) on at least one non-friction surface 14 of the carbon-carbon composite substrate. Friction surfaces 12 may not include the same high temperature coating as non-friction surfaces 14.

FIG. 1B is a conceptual diagram illustrating an example carbon-carbon composite 26 that includes a high temperature coating (not shown individually in FIG. 1B) formed in accordance with the techniques of this disclosure. In the example of FIG. 1B, carbon-carbon composite 26 is an extension nozzle of a thrust chamber assembly 20 having a conical shape or frustum. Thrust chamber assembly 20 may include an injector 22 for injecting rocket fuel and a combustion chamber 24 for combusting the rocket fuel to generate thrust. As a result of exhaust from this combustion, carbon-carbon composite 26 may experience high temperatures (e.g., 2400° C.). Carbon-carbon composite 26 includes a carbon-carbon composite substrate that includes an inner surface exposed to the combustion exhaust products and an outer surface exposed to an outer atmosphere. To protect the carbon-carbon composite substrate from oxidation, carbon-carbon composite 26 may include a high temperature coating on at least one surface of the carbon-carbon composite substrate.

Figure 2:
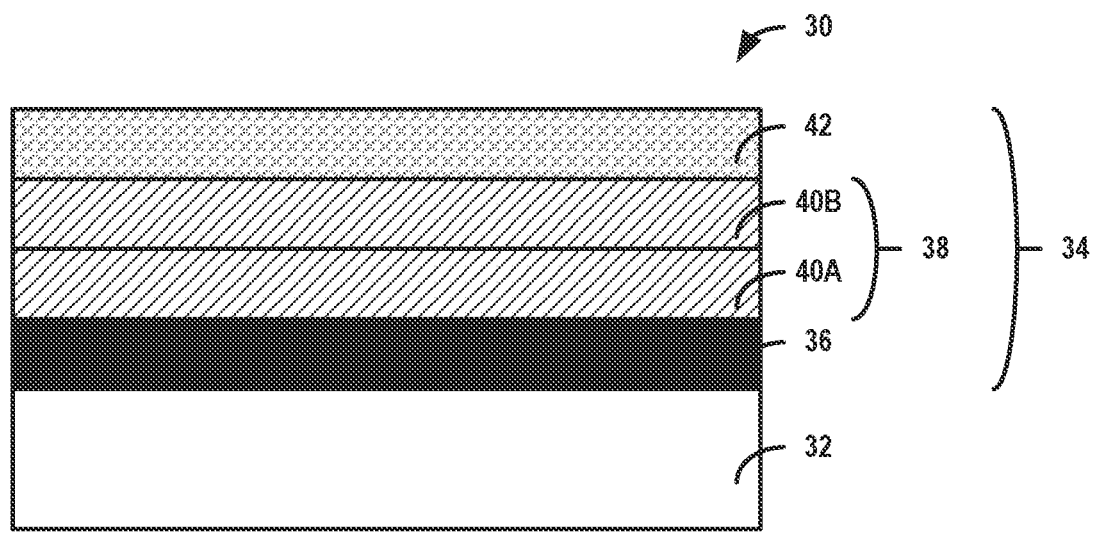
FIG. 2 is a schematic side view diagram of an example article that includes a high temperature coating formed in accordance with the techniques of this disclosure.

FIG. 2 is a schematic side view diagram of an article 30 that includes an example high temperature coating 34, according to examples of the disclosure. Article 30 includes a carbon-carbon composite substrate 32. Substrate 32 may include carbon-based reinforcement fibers and a carbon-based matrix material at least partially surrounding the carbon-based reinforcement fibers. In some examples, substrate 32 may be formed form a porous preform that includes carbon fibers or carbon-precursor fibers. Examples of porous preforms that may be used to produce substrate 32 include, but are not limited to: a fibrous preform, such as a woven fiber preform, a nonwoven fiber preform, a chopped-fiber and binder preform, a binder-treated random fiber preform, a carbon fiber preform, or a ceramic fiber preform; a foam preform; a porous carbon body preform; or a porous ceramic body preforms.

In some examples, the porous preform includes a plurality of mechanically bound layers, which can be, for example, a plurality of fibrous layers, such as a plurality of woven or nonwoven fabric layers, connected together, e.g., bound by a binder, such as a resin binder, or via needle-punching of the plurality of layers. In some examples, the layers include one or more tow layers, one or more web layers, or combinations thereof. Tow layers may include one or more tows of fibers. Tows of fibers may be arranged in any suitable arrangement including, for example, linear, radial, chordal, or the like. Web layers may include web fibers, which may include relatively short, chopped, and entangled fibers of fibers. In other examples, the porous preform may not include pre-defined layers, but, rather, may be formed from a bundle of fibers that are mechanically bound together, e.g., via needling. In other examples, a combination of any of the aforementioned types of porous preforms can be used.

Substrate 32 may also include a matrix material that at least partially encapsulates the carbon fibers. The matrix material may be introduced into the porous preform using one or more of a variety of techniques, including, for example, chemical vapor deposition/chemical vapor infiltration (CVD/CVI), resin transfer molding (RTM), vacuum/pressure infiltration (VPI), high pressure impregnation/carbonization (PIC), or the like.

Substrate 32 may be subject to high temperatures during operation. As one example, carbon-carbon composite brake discs may be subject to temperatures as high as about 3,000 degrees Fahrenheit (° F.) (about 1,649° C.) during braking events. As another example, carbon-carbon composite rocket nozzle extensions may be subject to temperatures as high as about 4,500° F. (about 2,482° C.) during rocket engine operation. To protect substrate 32 from oxidation, article 30 includes a high temperature coating 34 on one or more surfaces of substrate 32. Coating 34 may be stable at temperatures of up to about 3,500° F. (about 1,649° C.), such as temperatures of up to about 4,500° F. (about 2,482° C.). In this context, "stable" may mean that coating 34 does not degrade into its constituent elements, does not react with carbon, and/or does not react with other elements or compounds present in the environment in which coating 34 is used including, but not limited to, oxidation. Coating 34 may have any suitable thickness. In some examples, a thickness of coating 34 may be between about 0.0254 millimeters (mm) and about 10 mm. In some examples, a thickness of coating 34 may correspond to an application or expected length of service of article 30, such that a longer length of service may correspond to a higher thickness of coating 34. Coating 34 includes an undercoat 36 on a surface of substrate 32 (e.g., directly on substrate 32 or indirectly on substrate 32 through one or more intermediate layers). Undercoat 36 includes one or more substantially crystallized (e.g., greater than 95% by volume crystalline phase) metal carbide layers. In some examples, undercoat 36 may include at least one of silicon carbide (SiC), titanium carbide (TiC), tungsten carbide (WC), zirconium carbide (ZrC), combinations thereof, or any carbide layer formed using the principles of the process described in U.S. Pat. Nos. 6,555,173 and/or 4,837,073, which are incorporated by reference herein in their entirety.

Undercoat 36 may be configured to reduce delamination, spallation, and/or cracking of coating 34. Undercoat 36 may experience high temperatures that may exacerbate shear forces caused by differences in coefficient of thermal expansion between undercoat 36 and either/both substrate 32 and/or an adjacent coating of overcoat 38. To maintain these forces relatively low, undercoat 36 may have a coefficient of thermal expansion that is relatively similar to a coefficient of thermal expansion of substrate 32, overcoat 38, or both. For example, undercoat 36 may have a coefficient of thermal expansion that is within a range between about 4 parts per million per degree Celsius (ppm/° C.) and about 4.5 ppm/° C. In some examples, undercoat 36 may be chemically compatible with substrate 32, overcoat 38, or both. For example, undercoat 36 may have a selected wettability relative to substrate 32, overcoat 38, or both.

In some examples, undercoat 36 may be configured to increase adhesion between overcoat 38 and substrate 32. For example, as will be explained further below, undercoat 36 may be formed from an in situ process that involves reaction between reactive carbon and metal in stoichiometric excess. The excess metal may form a metal oxide that may migrate into microcracks of substrate 32, undercoat 36, and/or overcoat 38 to provide a self-healing functionality. The metal oxide may more strongly adhere to the polymer-derived ceramic matrix of overcoat 38, and/or may be at least partially impregnated into open pores of substrate 32. Additionally or alternatively, undercoat 36 may have a relatively low thickness, such as less than about 20 micrometers, and/or consistent thickness, such as within about 10 micrometers, that is controlled by an amount of reactive carbon present on substrate 32.

Article 30 includes an overcoat 38 on a surface of undercoat 36 (e.g., directly on undercoat 36 or indirectly on undercoat 36 through one or more intermediate layers). Overcoat 38 may be configured to reduce or prevent migration of reactive oxidizing species into substrate 32 at high temperatures. Overcoat 38 includes a plurality of overcoat layers 40. In the example of FIG. 2, two overcoat layers 40A and 40B are shown; however, overcoat 38 may include any number of overcoat layers 40. For example, overcoat 38 may include between three and ten overcoat layers 40, including an outermost overcoat layer providing a relatively high temperature stability, and innermost overcoat layer 40 providing a relatively high barrier to oxidizing species, and one or more intermediate overcoat layers 40 providing a relatively gradual gradient of coefficient of thermal expansion and/or thermal conductivity. Each overcoat layer 40 includes a ceramic matrix and a plurality of refractory ceramic particles within the ceramic matrix. For example, the ceramic matrix may form a continuous phase and the plurality of refractory ceramic particles may form a dispersed phase within the continuous phase.

The refractory ceramic particles of overcoat layers 40 may include any high temperature refractory ceramic material. A high temperature refractory ceramic material may include any ceramic material that maintains thermal and chemical stability at temperatures above about 1500° C. A composition of the refractory ceramic particles may be selected for a variety of properties including, but not limited to, a melting point of the ceramic material, a coefficient of thermal expansion of the ceramic material, a thermal conductivity of the ceramic material, compatibility with a selected polymer-derived ceramic matrix, and the like. For example, a melting point of the refractory ceramic particles in each overcoat layer 40 may be higher than an anticipated temperature encountered at the corresponding overcoat layer 40 during operation of article 30. In some examples, the refractory ceramic particles may have a melting point greater than about 1600° C., such as greater than about 2400° C. Example ceramic materials may include, but are not limited to, hafnium carbide (HfC), hafnium nitride (HfN), hafnium diboride (HfB$_2$), tantalum carbide (TaC), tantalum diboride (TB2), silicon carbide (SiC), zirconium diboride and silicon carbide (ZrB$_2$-20% SiC), hafnium diboride and silicon carbide (HfB$_2$-20% SiC), hafnium oxide (HfO$_2$), tungsten carbide (WC), rhenium carbide (ReC), combinations thereof, and other refractory ceramic materials.

The ceramic matrix of overcoat layers 40 may include any high temperature, polymer-derived ceramic material. A polymer-derived ceramic material may include any ceramic material formed from decomposition of a pre-ceramic polymer and subsequent formation of a crystalline phase. A high temperature, polymer-derived ceramic material may include any polymer-derived ceramic material that, once substantially crystallized, maintains thermal and chemical stability above about 1500° C. A composition of the polymer-derived ceramic material may be selected for a variety of properties including, but not limited to, a decomposition temperature of the polymer-derived ceramic material, a crystallization temperature for one or more crystalline phases of the polymer-derived ceramic material, a coefficient of thermal expansion of the polymer-derived ceramic material, a molecular weight of a pre-ceramic polymer, a thermal conductivity of the polymer-derived ceramic material, a porosity of the polymer-derived ceramic material, mechanical properties of the polymer-derived ceramic material, compatibility and adhesion with the ceramic particles, and the like. The ceramic matrix may be substantially crystallized, such that the ceramic matrix is substantially free of glass/amorphous phases. For example, the ceramic matrix may include one or more crystalline phases distributed in an amorphous phase, such that the amorphous phase is less than about 5% by volume of the ceramic matrix. Example polymer-derived ceramic materials may include, but are not limited to, binary ceramics, such as silicon carbide (SiC) or silicon nitride ($Si_3N_4$); ternary ceramics, such as silicon oxycarbide ($SiO_xC_y$); quaternary ceramics; combinations thereof, and other polymer-derived ceramic materials.

Rather than form overcoat 38 as a single monolithic layer having relatively homogeneous properties, overcoat 38 includes two or more overcoat layers 40 that enable properties of overcoat 38 to be varied along a depth (or z-axis) of overcoat 38 (e.g., normal to a surface of substrate 32). Two or more overcoat layers 40 within overcoat 38 may have different porosities, different thermal expansion properties, different thermal conductivities, different thicknesses, different melting points, and/or other variations in physical or chemical properties.

In some examples, the combination of overcoat layers 40 may define one or more gradients of one or more properties within overcoat 38 or one or more differences in one or more properties between two or more overcoat layers 40 within overcoat 38. For example, certain properties of overcoat 38 may be more or less important at particular depths or positions within overcoat 38 based on a proximity of a portion of overcoat 38 to a surface (e.g., innermost or outermost) of overcoat 38 or adjacent layer (e.g., undercoat 36).

As one example, overcoat layers 40 may form a composition gradient through overcoat 38 or have a composition difference between two or more overcoat layers 40 within overcoat 38. For example, one or more species within overcoat layer 40A nearest substrate 32 and undercoat 36 may be more likely to migrate into or interact with a species in substrate 32 or undercoat 36. In the example of FIG. 2, a composition of overcoat layer 40A nearest substrate 32 and undercoat 36 may be more chemically compatible with substrate 32 and/or undercoat 36 compared to the composition of overcoat layer 40B.

As another example, overcoat layers 40 may form a porosity gradient through overcoat 38 or have a porosity difference between two or more overcoat layers 40 within overcoat 38. For example, an oxidizing species may more easily migrate through a porous coating than a dense coating, such that one or more overcoat layers 40 within overcoat 38 may have a relatively low porosity to reduce migration of the oxidizing species. In the example of FIG. 2, a porosity of overcoat layer 40A nearest substrate 32 and undercoat 36 may be lower, and therefore more dense, compared to a porosity of overcoat layer 40B further from substrate 32 and/or undercoat 36.

As another example, overcoat layers 40 may form a thermal conductivity gradient through overcoat 38. For example, a high temperature of an external atmosphere in contact with overcoat 38 may damage substrate 32, such that one or more overcoat layers 40 within overcoat 38 may have a relatively low thermal conductivity to limit heat transfer to underlying layers or substrates, such as substrate 32. In the example of FIG. 2, a thermal conductivity of overcoat layer 40A nearest substrate 32 and undercoat 36 may be higher than a thermal conductivity of overcoat layer 40B.

As another example, overcoat layers 40 may form a coefficient of thermal expansion (CTE) gradient through overcoat 38. For example, a CTE of substrate 32 and/or undercoat 36 may be substantially different, such as substantially lower, than a CTE of an outermost overcoat layer 40 (or other overcoat layer 40) of overcoat 38. To reduce interlaminar forces between substrate 32, undercoat 36, and overcoat layers 40 of overcoat 38 caused by differences in thermal expansion at high temperatures, overcoat layers 40 may form a CTE gradient that incrementally changes between substrate 32 or undercoat 36 and an outermost overcoat layer 40B (or other overcoat layer 40) in overcoat 38. In the example of FIG. 2, a CTE of overcoat layer 40A may be between a CTE of undercoat 36 and a CTE of overcoat layer 40B.

As another example, overcoat layer 40 may form a thermal stability gradient through overcoat 38. For example, a temperature of one or more outer overcoat layers 40 of overcoat 38 may experience higher temperatures than other inner overcoat layers 40, such that the one or more outer overcoat layers 40 may have higher degradation or melting temperatures than the inner overcoat layers 40. In the example of FIG. 2, a degradation or melting point of overcoat layer 40A (e.g., components within overcoat layer 40A) may be lower than a degradation or melting point of overcoat layer 40B nearest to an outer surface of overcoat 38.

Parameters and compositions of the plurality of refractory ceramic particles and/or the ceramic matrix of each layer may be selected to provide overcoat 38 with various properties described above. By configuring overcoat layers 40 to have different compositions or parameters, overcoat 38 may be configured to reduce thermal conductivity through overcoat 38 to substrate 32, improve oxidation and/or environmental attack resistance of overcoat 38, and/or improve mechanical properties of article 30 compared to an overcoat that does not include multiple overcoat layers.

In some examples, at least two of overcoat layers 40 include a different average particle size or shape and/or a different particle size distribution of the plurality of ultra-high melting point refractory ceramic particles within the ceramic matrix. For example, overcoat layer 40A may include a different average particle size or shape and/or difference particle size distribution of the plurality of ultra-high melting point refractory ceramic particles than overcoat layer 40B. A density of an overcoat layer 40 may be related to a compaction or packing density of the plurality of refractory ceramic particles. To produce an overcoat layer 40 that will resist shrinkage during heat treatment (e.g., pyrolysis and crystallization), a mixture used to form the respective overcoat layer 40 may include a bimodal distribution of particle sizes. This particle size distribution may be configured to form a highly packed overcoat layer 40 upon heat treatment that resists cracking during and after formation. The particle size distribution may vary based on a composition of the refractory ceramic particles, composition of the ceramic matrix, and volume ratio of the refractory ceramic particles to ceramic matrix, such that different overcoat layers 40 having different compositions and volume ratios of the refractory ceramic particles and ceramic matrices may have different particle size distributions. In some examples, a difference between the average (e.g., median) particle size (e.g., diameter) of the refractory ceramic particles between two overcoat layers is at least about 50%.

In some examples, at least two of overcoat layers 40 may include a different particle composition of the plurality of ultra-high melting point refractory ceramic particles. For example, overcoat layer 40A may include a different particle composition or combination/mixture of particle compositions of the plurality of ultra-high melting point refractory ceramic particles than overcoat layer 40B. A particular composition of the refractory ceramic particles may have particular chemical and thermal properties, such as melting point and coefficient of thermal expansion, that may be more suitable at a particular depth within overcoat 38. As one example, refractory ceramic particles of overcoat layer 40B nearest to an outer surface of overcoat 38 may have a higher melting point than refractory ceramic particles of overcoat layer 40A, as overcoat layer 40B may be exposed to a higher temperature than overcoat layer 40A. For example, refractory ceramic particles of overcoat layer 40B may be selected such that an outermost layer of overcoat 38 forms an ultra-high temperature oxide during operation, such as $HfO_2$. As another example, refractory ceramic particles of overcoat layer 40A may have a coefficient of thermal expansion that more closely matches undercoat 36 than refractory ceramic particles of overcoat layer 40B, such that forces at an interface between undercoat 36 and overcoat 38 may be reduced.

In some examples, at least two of overcoat layers 40 include a different mixture of particle compositions of the plurality of ultra-high melting point refractory ceramic particles. The plurality of refractory ceramic particles may include a mix of more than one species, such that the corresponding overcoat layer 40 may have properties resulting from a blend of refractory ceramic particles.

In some examples, at least two of overcoat layers 40 may include a different matrix composition of the ceramic matrix. For example, overcoat layer 40A may include a different composition of the ceramic matrix than overcoat layer 40B. A particular composition of the ceramic matrix may have particular chemical and thermal properties, such as melting point and coefficient of thermal expansion, that may be more suitable at a particular depth within overcoat 38. As one example, the ceramic matrix of overcoat layer 40B nearest to an outer surface of overcoat 38 may have a higher melting point than the ceramic matrix of overcoat layer 40A, as overcoat layer 40B may be exposed to a higher temperature than overcoat layer 40A. As another example, the ceramic matrix of overcoat layer 40A may have a coefficient of thermal expansion that more closely matches undercoat 36 than the ceramic matrix of overcoat layer 40B, such that forces at an interface between undercoat 36 and overcoat 38 may be reduced.

In some examples, at least two of overcoat layers 40 include a different volume ratio of the ceramic matrix to the plurality of ultra-high melting point refractory ceramic particles. For example, various properties of each overcoat layer 40, such as effective coefficient of thermal expansion, may result from a combination of properties of the refractory ceramic particles and the ceramic matrix. As one example, intermediate overcoat layer 40A may have a volume ratio of the ceramic matrix to the plurality of refractory ceramic particles that corresponds to a lower CTE than a volume ratio of the ceramic matrix to the refractory ceramic particles of overcoat layer 40A, such that a difference in CTE between undercoat 36 and overcoat layer 40B may be incremented through overcoat layer 40A.

In some examples, high temperature coating 34 includes an oxide layer 42 on a surface of overcoat 38. For example, ultra-high temperature applications may exceed a capacity of metal carbides for heat protection. Oxide layer 42 includes a high temperature metal oxide formed from a metal carbide, as will be described further below. Example metal oxide materials that may be used include, but are not limited to, hafnium oxide ($HfO_2$), zirconium oxide ($ZrO_2$), and the like.

Figure 3:
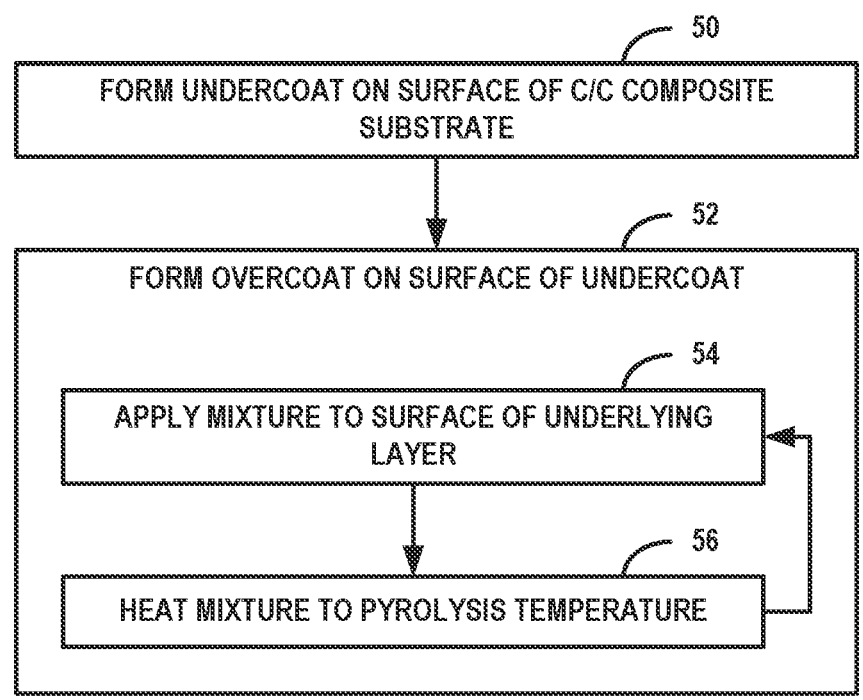
FIG. 3 is a flow diagram illustrating an example technique for forming a high temperature coating, according to examples of the disclosure.

FIG. 3 is a flow diagram illustrating an example technique for forming a high temperature coating, according to examples of the disclosure. The technique of FIG. 3 will be described with respect to article 30 of FIG. 2; however, the technique of FIG. 3 may form other articles that include high temperature coatings, such as with a greater number of layers.

The technique of FIG. 3 includes forming a crystallized metal carbide undercoat 36 on a surface of carbon-carbon composite substrate 32 (50). In some examples, undercoat 36 may be formed in situ using a metal-rich combination of one or more carbon coatings and one or more metal coatings. Forming undercoat 36 may include cleaning the surface of substrate 32, applying a reactive carbon coating on the surface of substrate 32, such as through brush coating, and drying the carbon coating. Forming undercoat 36 may further include applying a metal coating on the carbon coating and drying the metal coating. The metal coating may be applied at a metal-rich, stoichiometric excess. Forming undercoat 36 may further include heating the carbon coating and metal coating to a heat treatment temperature. The heat treatment temperature may be sufficiently high to mobilize the metal of the metal coating, such as through melting, and react the metal with the carbon of the carbon coating to form a crystallized metal carbide. The metal carbide may be further heated to further alter the microstructure, phase composition, or other properties or characteristics of the metal carbide. Excess metal from the metal coating may migrate into pores of substrate 32. The resulting undercoat 36 may include a metal carbide portion on the surface of substrate 32 and a metal portion extending into substrate 32.

The technique of FIG. 3 includes forming overcoat 38 on a surface of undercoat 36 (52). The overcoat comprises a plurality of crystallized ultra-high melting point overcoat layers 40.

Each overcoat layer is sequentially formed by applying a mixture to a surface of an underlying layer (54). The mixture comprises a plurality of ultra-high melting point refractory ceramic particles and a pre-ceramic polymer. The pre-ceramic polymer of each mixture may be selected for desired properties of a resulting pyrolyzed, crystallized ceramic matrix. A variety of pre-ceramic polymers may be used including, but not limited to, polysilanes, polycarbosilanes, polysiloxanes, polycarbosiloxanes, polysilazanes, polycarbosilazanes, and the like. A variety of methods may be used to apply the mixture to an underlying layer. In some examples, the mixture is applied using at least one of brush painting or spray painting. For example, brush or spray painting may be relatively inexpensive and may form relatively thin layers, such that overcoat 38 may include a large number of layers while remaining relatively thin.

In some examples, a composition, particle size or shape, and/or particle size distribution of each mixture may be selected to produce a resulting ceramic matrix that is relatively free of thermal defects, such as cracking caused by changes in temperature during pyrolysis or crystallization. For example, during pyrolysis of the pre-ceramic polymer, the pre-ceramic polymer may change dimension due to shrinkage from release of various volatiles, thermal expansion, or other dimensional change due to temperature. This dimensional change may be different than a dimensional change of the plurality of refractory ceramic particles or an adjacent underlying coating, such as due to a different coefficient of thermal expansion or a relatively lower chemical stability of the preceramic polymer. As such, a respective mixture used to form each respective overcoat layer may be different in one or more respects. For example, the composition, particle size or shape, and/or particle size distribution for a first mixture applied to form layer 40A is different than the composition, particle size or shape, and/or particle size distribution for a second mixture applied to form layer 40B.

Each overcoat layer may be sequentially formed by heating the mixture to a heat treatment temperature in an inert atmosphere or under vacuum (56). The heat treatment temperature is sufficiently high to pyrolyze the pre-ceramic polymer and form a ceramic matrix. The heat treatment temperature may also be sufficiently high to crystallize the ceramic matrix. For example, the heat treatment temperature may be sufficiently high to convert most or all of a glassy phase into one or more crystalline phases. In some examples, heat treatment temperature may be greater than about 1800° F. for several hours, such as about 2600° F. The resulting overcoat layer 40 includes a crystallized ultra-high melting point polymer-derived ceramic matrix that includes the plurality of ultra-high melting point refractory ceramic particles.

Forming overcoat 38 may include forming two or more overcoat layers 40. As one example, to form two overcoat layers 40A and 40B illustrated in FIG. 2, the technique may include applying a first mixture to a surface of undercoat 36 and subsequently heating the first mixture to pyrolyze a first preceramic polymer of the first mixture to form a first overcoat layer 40A. To form a subsequent layer, the technique may include applying a second mixture to a surface of first overcoat layer 40A and subsequently heating the second mixture to pyrolyze a second preceramic polymer of the second mixture to form a second overcoat layer 40B. This process of application of a mixture and heating of the mixture to form an overcoat layer 40 may be repeated until a desired number of overcoat layers 40 are formed.

As described above, a composition of the preceramic mixture used to form a particular overcoat layer 40 may be selected for various properties of the resulting overcoat layer 40. As such, various parameters of the preceramic mixture may vary among application of two or more overcoat layers 40.

As one example, an average particle size or shape and/or a distribution of particle size of a first plurality of refractory ceramic particles of the first mixture used to form first overcoat layer 40A may be different from an average particle size or shape of a second plurality of refractory ceramic particles of the second mixture used to form second overcoat layer 40B, such that first overcoat layer 40A and second overcoat layer 40B include a different average particle size or shape of respective first and second pluralities of refractory ceramic particles. As another example, a particle composition of the first plurality of refractory ceramic particles and/or a composition of a first pre-ceramic polymer of the first mixture used to form first overcoat layer 40A may be different from a particle composition of the second plurality of refractory ceramic particles or a composition of a second pre-ceramic polymer of the second mixture used for form second overcoat layer 40B, such that first overcoat layer 40A and second overcoat layer 40B include a different particle composition of respective first and second pluralities of refractory ceramic particles.

As another example, a composition of the first pre-ceramic polymer or volume ratio of the first pre-ceramic polymer to the first plurality of refractory ceramic particles may be different from a composition of the second pre-ceramic polymer or volume ratio of the second pre-ceramic polymer to the second plurality of refractory ceramic particles, such that first overcoat layer 40A and second overcoat layer 40B may include a different volume ratio of the first ceramic matrix to the first plurality of refractory ceramic particles and the second ceramic matrix to the second plurality of refractory ceramic particles. For example, each of the plurality of overcoat layers includes a varying volume ratio of the ceramic matrix to the plurality of ultra-high melting point refractory ceramic particles from the surface of undercoat 36 to a surface of overcoat 38. In some examples, a volume ratio of the plurality of ultra-high melting point refractory ceramic particles to the pre-ceramic polymer is between about 30:70 and about 70:30.

In some examples, the technique of FIG. 3 may include forming an oxide layer 42 on a surface of overcoat 38. Forming the oxide layer may include applying a metal carbide coating to a surface of the plurality of overcoat layers and heating the metal carbide coating. As the metal carbide heats, metal from the metal carbide may react with oxygen to form a metal oxide that has a higher thermal stability (e.g., degradation or melting temperature) than the metal carbide.

As described above, the techniques of FIG. 3 may be used to form high temperature coatings customized for particular high temperature applications. As one example of how such selection and customization may be performed, an outermost overcoat layer 40 of overcoat 38, which may be exposed to the highest temperatures, may be determined based on an anticipated temperature encountered at an outer surface of overcoat 38. A composition of the plurality of refractory ceramic particles and a pre-ceramic polymer corresponding to a ceramic matrix, each having a melting point above the anticipated temperature, may be selected for the outermost overcoat layer 40.

The combination of refractory ceramic particles and ceramic matrix of the outermost overcoat layer 40 may have a resulting CTE and thermal conductivity. In some examples, various overcoat layers 40 between an outermost overcoat layer 40 and undercoat 36 may be configured to produce a CTE gradient. For example, the CTE of the outermost overcoat layer 40 may be substantially different than a CTE of substrate 32. A composition of metal carbide for undercoat 36 and/or a composition, particle size, particle size distribution, or volume ratio of the refractory ceramic particles and/or pre-ceramic polymer corresponding to the ceramic matrix of overcoat layers 40 may be selected to incrementally increase or decrease a CTE, such that a difference in CTE between adjacent layers may be reduced. In some examples, various overcoat layers 40 between an outermost overcoat layer 40 and undercoat 36 may be configured to produce a thermal conductivity gradient. For example, the anticipated temperature experienced by the outermost layer may be substantially higher than desired for substrate 32. A composition or volume ratio of the refractory ceramic particles and/or pre-ceramic polymer corresponding to the ceramic matrix of overcoat layers 40 may be selected to reduce thermal conductivity, such that a heat flux (and temperature) through each subsequent overcoat layer 40 may be reduced.

Figure 4:
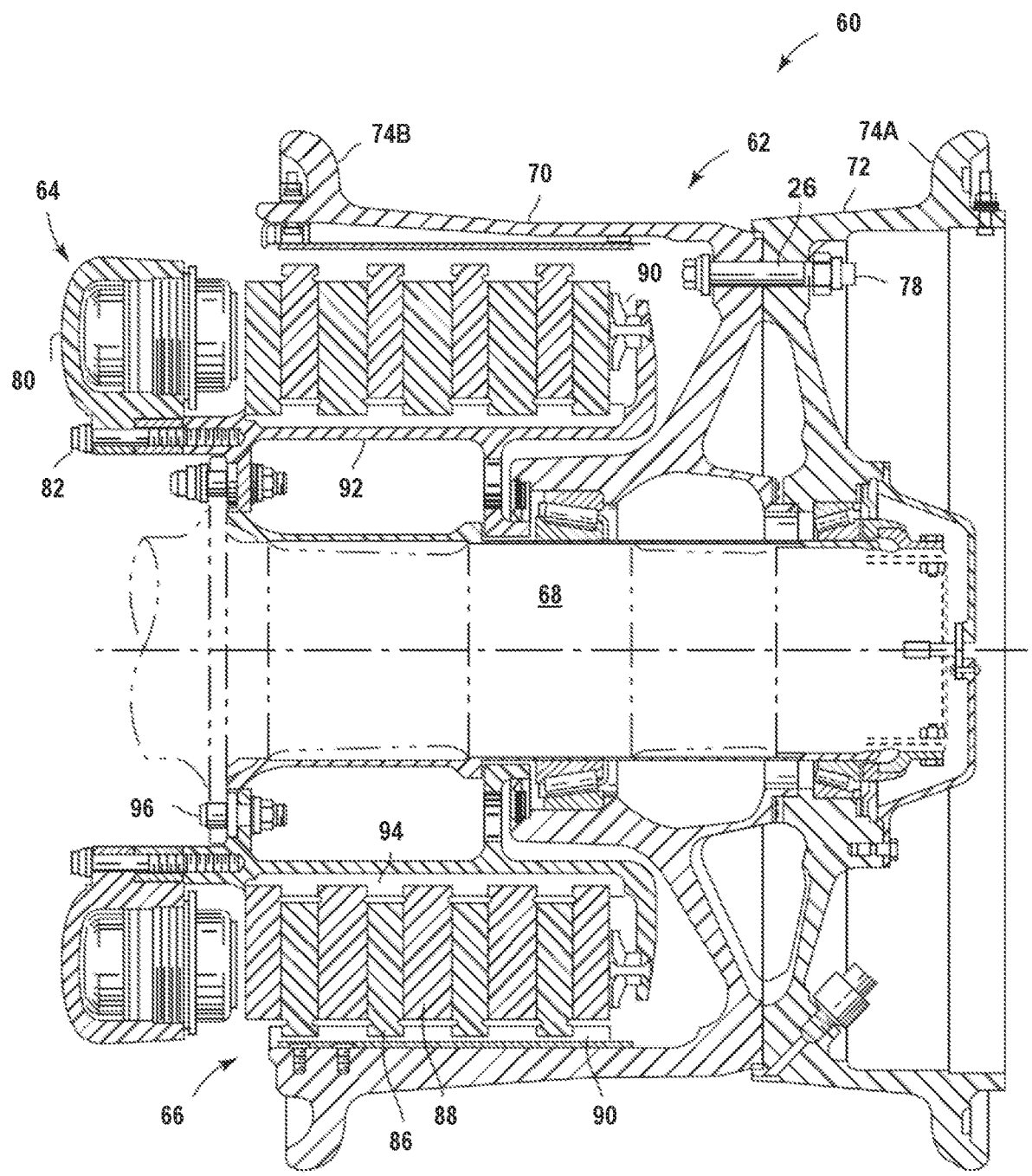
FIG. 4 is a schematic diagram illustrating an example aircraft brake assembly including composite brake disc that include a high temperature coating formed in accordance with the techniques of this disclosure.

As described in FIG. 1A, high temperature coatings described herein may be used in aircraft brakes. FIG. 4 is a schematic diagram illustrating an example aircraft brake assembly including composite brake disc that include a high temperature coating formed in accordance with the techniques of this disclosure. For ease of description, examples of the disclosure will be described primarily with regard to aircraft brake assemblies. However, the articles of this disclosure may be used to form brake components other than aircraft brake discs. For example, the brake components may be used as friction materials in other types of braking applications and vehicles.

In the example of FIG. 4, wheel and brake assembly 60 includes a wheel 62, an actuator assembly 64, a brake stack 66, and an axle 68. Wheel 62 includes wheel hub 70, wheel outrigger flange 72, bead seals 74A and 74B, lug bolt 76, and lug nut 78. Actuator assembly 64 includes actuator housing 80, actuator housing bolt 82, and ram 84. Brake stack 66 includes alternating rotor brake discs 86 and stator brake discs 88; rotor brake discs 86 are configured to move relative to stator brake discs 88. Rotor brake discs 86 are mounted to wheel 62, and in particular wheel hub 70, by beam keys 90. Stator brake discs 88 are mounted to axle 68, and in particular torque tube 92, by splines 94. Wheel and brake assembly 60 may support any variety of private, commercial, or military aircraft or other type of vehicle.

Wheel and brake assembly 60 includes wheel 62, which in the example of FIG. 4 is defined by a wheel hub 70 and a wheel outrigger flange 72. Wheel outrigger flange 72 may be mechanically affixed to wheel hub 70 by lug bolts 76 and lug nuts 78. Wheel 62 defines bead seals 74A and 74B. During assembly, an inflatable tire (not shown) may be placed over wheel hub 70 and secured on an opposite side by wheel outrigger flange 72. Thereafter, lug nuts 78 can be tightened on lug bolts 76, and the inflatable tire can be inflated with bead seals 74A and 74B providing a hermetic seal for the inflatable tire.

Wheel and brake assembly 60 may be mounted to a vehicle via torque tube 92 and axle 68. In the example of FIG. 4, torque tube 92 is affixed to axle 68 by a plurality of bolts 96. Torque tube 92 supports actuator assembly 64 and stator brake discs 88. Axle 68 may be mounted on a strut of a landing gear (not shown) or other suitable component of the vehicle to connect wheel and brake assembly 60 to the vehicle.

During operation of the vehicle, braking may be necessary from time to time, such as during landing and taxiing procedures of an aircraft. Wheel and brake assembly 60 is configured to provide a braking function to the vehicle via actuator assembly 64 and brake stack 66. Actuator assembly 64 includes actuator housing 80 and ram 84. Actuator assembly 64 may include different types of actuators such as one or more of, e.g., an electrical-mechanical actuator, a hydraulic actuator, a pneumatic actuator, or the like. During operation, ram 84 may extend away from actuator housing 80 to axially compress brake stack 66 against a compression point for braking.

Brake stack 66 includes alternating rotor brake discs 86 and stator brake discs 88. Rotor brake discs 86 are mounted to wheel hub 70 for common rotation by beam keys 90. Stator brake discs 88 are mounted to torque tube 92 by splines 94. In the example of FIG. 4, brake stack 66 includes four rotors and five stators. However, a different number of rotors and/or stators may be included in brake stack 66 in other examples.

In some examples, rotor brake discs 86 and stator brake discs 88 may be mounted in wheel and brake assembly 60 by beam keys 90 and splines 94, respectively. In some examples, beam keys 90 may be circumferentially spaced about an inner portion of wheel hub 70. Beam keys 90 may, for example, be shaped with opposing ends (e.g., opposite sides of a rectangular) and may have one end mechanically affixed to an inner portion of wheel hub 70 and an opposite end mechanically affixed to an outer portion of wheel hub 70. Beam keys 90 may be integrally formed with wheel hub 70 or may be separate from and mechanically affixed to wheel hub 70, e.g., to provide a thermal barrier between rotor brake discs 86 and wheel hub 70. Toward that end, in different examples, wheel and brake assembly 60 may include a heat shield (not shown) that extends out radially and outwardly surrounds brake stack 66, e.g., to limit thermal transfer between brake stack 66 and wheel 62.

In some examples, splines 94 may be circumferentially spaced about an outer portion of torque tube 92. As such, stator brake discs 88 may include a plurality of radially inwardly disposed lug notches along an inner diameter of the brake disc configured to engage with splines 94. Similarly, rotor brake discs 86 may include a plurality of radially inwardly disposed lug notches along an outer diameter of the brake disc configured to engage with beam keys 90. As such rotor brake discs 86 will rotate with the motion of the wheel while stator brake discs 88 remain stationary allowing the friction surfaces of an adjacent stator brake disc 88 and rotor brake disc 86 to engage with one another to deaccelerate the rotation of wheel 62.

Rotor brake discs 86 and stator brake discs 88 may provide opposing friction surfaces for braking an aircraft. As kinetic energy of a moving aircraft is transferred into thermal energy in brake stack 66, temperatures may rapidly increase in brake stack 66. As such, rotor brake discs 86 and stator brake discs 88 that form brake stack 66 may include coatings capable of operating at very high temperatures and blocking various oxidizing species.

Example 1

A method includes forming a crystallized metal carbide undercoat on a surface of a carbon-carbon composite substrate; and forming an overcoat on a surface of the undercoat, wherein the overcoat comprises a plurality of crystallized ultra-high melting point overcoat layers, and wherein each overcoat layer is sequentially formed by at least: applying a mixture to a surface of an underlying layer, wherein the mixture comprises a plurality of ultra-high melting point refractory ceramic particles and a pre-ceramic polymer; and heating, in an inert atmosphere or under vacuum, the mixture to a heat treatment temperature to pyrolyze the pre-ceramic polymer and form the overcoat layer, wherein the overcoat layer comprises a crystallized ultra-high melting point polymer-derived ceramic matrix that includes the plurality of ultra-high melting point refractory ceramic particles.

Example 2

The method of example 1, wherein a melting point of each particle of the plurality of ultra-high melting point refractory ceramic particles and the ultra-high melting point polymer-derived ceramic matrix is greater than about 1500 degrees Celsius (° C.).

Example 3

The method of any of examples 1 and 2, wherein at least two layers of the plurality of overcoat layers include a ceramic matrix having at least one of a different coefficient of thermal expansion or a different thermal conductivity.

Example 4

The method of any of examples 1 through 3, wherein a melting point of the ceramic matrix of an outermost overcoat layer of the plurality of overcoat layers is higher than a melting point of the ceramic matrix of an underlying overcoat layer of the plurality of overcoat layers.

Example 5

The method of any of examples 1 through 4, wherein at least one of: a first mixture used to form a first layer of the plurality of overcoat layers includes a different average particle size or shape of the plurality of ultra-high melting point refractory ceramic particles than a second mixture used to form a second layer of the plurality of overcoat layers, or a first mixture used to form a first layer of the plurality of overcoat layers includes a different particle size distribution of the plurality of ultra-high melting point refractory ceramic particles than a second mixture used to form a second layer of the plurality of overcoat layers.

Example 6

The method of any of examples 1 through 5, wherein at least one of: a first mixture used to form a first layer of the plurality of overcoat layers includes a different particle composition of the plurality of ultra-high melting point refractory ceramic particles than a second mixture used to form a second layer of the plurality of overcoat layers, a first mixture used to form a first layer of the plurality of overcoat layers includes a different mixture of particle compositions of the plurality of ultra-high melting point refractory ceramic particles than a second mixture used to form a second layer of the plurality of overcoat layers, or a first mixture used to form a first layer of the plurality of overcoat layers includes a different composition of the preceramic polymer than a second mixture used to form a second layer of the plurality of overcoat layers.

Example 7

The method of any of examples 1 through 6, a first layer of the plurality of overcoat layers includes a different volume ratio of the ceramic matrix to the plurality of ultra-high melting point refractory ceramic particles compared to a second layer of the plurality of overcoat layers.

Example 8

The method of example 7, wherein each layer of the plurality of overcoat layers includes a varying volume ratio of the ceramic matrix to the plurality of ultra-high melting point refractory ceramic particles from the surface of the undercoat to a surface of the overcoat.

Example 9

The method of any of examples 1 through 8, wherein applying the mixture to the surface comprises at least one of brush painting the mixture onto the surface or spray painting the mixture onto the surface.

Example 10

The method of any of examples 1 through 9, further includes applying a metal carbide coating to a surface of the plurality of overcoat layers; and heating the metal carbide coating to form a metal oxide coating.

Example 11

An article includes a carbon-carbon composite substrate; a crystallized metal carbide undercoat on a surface of the carbon-carbon composite substrate; and an overcoat on a surface of the undercoat, wherein the overcoat comprises a plurality of crystallized ultra-high melting point overcoat layers, and wherein each of the plurality of overcoat layers comprises a crystallized ultra-high melting point polymer-derived ceramic matrix that includes a plurality of ultra-high melting point refractory ceramic particles.

Example 12

The article of example 11, wherein a melting point of each particle of the plurality of ultra-high melting point refractory ceramic particles and the ultra-high melting point polymer-derived ceramic matrix is greater than about 1500 degrees Celsius (° C.).

Example 13

The article of any of examples 11 and 12, wherein at least two layers of the plurality of overcoat layers include a ceramic matrix having at least one of a different coefficient of thermal expansion or a different thermal conductivity.

Example 14

The article of any of examples 11 through 13, wherein a melting point of the ceramic matrix of an outermost overcoat layer of the plurality of overcoat layers is higher than a melting point of the ceramic matrix of an underlying overcoat layer of the plurality of overcoat layers.

Example 15

The article of any of examples 11 through 14, wherein at least one of: a first layer of the plurality of overcoat layers includes a different average particle size or shape of the plurality of ultra-high melting point refractory ceramic particles than a second layer of the plurality of overcoat layers, or a first layer of the plurality of overcoat layers includes a different particle size distribution of the plurality of ultra-high melting point refractory ceramic particles than a second layer of the plurality of overcoat layers.

Example 16

The article of any of examples 11 through 15, wherein at least one of: a first layer of the plurality of overcoat layers includes a different particle composition of the plurality of ultra-high melting point refractory ceramic particles than a second layer of the plurality of overcoat layers, a first layer of the plurality of overcoat layers includes a different mixture of particle compositions of the plurality of ultra-high melting point refractory ceramic particles than a second layer of the plurality of overcoat layers, or a first layer of the plurality of overcoat layers includes a different composition of the ceramic matrix than a second layer of the plurality of overcoat layers.

Example 17

The article of any of examples 11 through 16, wherein a first layer of the plurality of overcoat layers includes a different volume ratio of the ceramic matrix to the plurality of ultra-high melting point refractory ceramic particles compared to a second layer of the plurality of overcoat layers.

Example 18

The article of example 17, wherein each layer of the plurality of overcoat layers includes a varying volume ratio of the ceramic matrix to the plurality of ultra-high melting point refractory ceramic particles from the surface of the undercoat to a surface of the overcoat.

Example 19

The article of any of examples 11 through 18, further comprising a metal oxide coating on a surface of the overcoat.

Example 20

The article of any of examples 11 through 19, wherein the carbon-carbon composite substrate comprises a component of an aircraft.

Various examples have been described. These and other examples are within the scope of the following claims.

What is claimed is:

1. A method, comprising:
forming a crystallized metal carbide undercoat on a surface of a carbon-carbon composite substrate; and
forming an overcoat on a surface of the crystallized metal carbide undercoat,
wherein the overcoat comprises a plurality of crystallized ultra-high melting point overcoat layers,
wherein at least two overcoat layers of the plurality of overcoat layers have at least one of a different coefficient of thermal expansion, thermal conductivity, porosity, or thermal stability,
wherein each overcoat layer is sequentially formed on an underlying layer by at least:
applying a mixture to a surface of the underlying layer, wherein the mixture comprises a plurality of ultra-high melting point refractory ceramic particles and a pre-ceramic polymer, wherein the ultra-high melting point refractory ceramic particles have a melting point of at least about 2400° C.; and
prior to applying a mixture for a subsequent layer, heating, in an inert atmosphere or under vacuum, the mixture to a heat treatment temperature to pyrolyze the pre-ceramic polymer and form the overcoat layer,
wherein each overcoat layer comprises a crystallized ultra-high melting point polymer-derived ceramic matrix that includes the plurality of ultra-high melting point refractory ceramic particles, and
wherein an outermost layer of the overcoat comprises an outermost overcoat layer of the plurality of overcoat layers.

2. The method of claim 1, wherein a melting point of the ultra-high melting point polymer-derived ceramic matrix is greater than about 1500 degrees Celsius (° C.).

3. The method of claim 1, wherein at least two layers of the plurality of overcoat layers include a ceramic matrix having at least one of a different coefficient of thermal expansion or a different thermal conductivity.

4. The method of claim 1, wherein a melting point of the ceramic matrix of the outermost overcoat layer of the plurality of overcoat layers is higher than a melting point of the ceramic matrix of an underlying overcoat layer of the plurality of overcoat layers.

5. The method of claim 1, wherein at least one of:
a first mixture used to form a first layer of the plurality of overcoat layers includes a different average particle size or shape of the plurality of ultra-high melting point refractory ceramic particles than a second mixture used to form a second layer of the plurality of overcoat layers, or a first mixture used to form a first layer of the plurality of overcoat layers includes a different particle size distribution of the plurality of ultra-high melting point refractory ceramic particles than a second mixture used to form a second layer of the plurality of overcoat layers.

6. The method of claim 1, wherein at least one of:
a first mixture used to form a first layer of the plurality of overcoat layers includes a different particle composition of the plurality of ultra-high melting point refractory ceramic particles than a second mixture used to form a second layer of the plurality of overcoat layers,
a first mixture used to form a first layer of the plurality of overcoat layers includes a different mixture of particle compositions of the plurality of ultra-high melting point refractory ceramic particles than a second mixture used to form a second layer of the plurality of overcoat layers, or
a first mixture used to form a first layer of the plurality of overcoat layers includes a different composition of the pre-ceramic polymer than a second mixture used to form a second layer of the plurality of overcoat layers.

7. The method of claim 1, a first layer of the plurality of overcoat layers includes a different volume ratio of the ceramic matrix to the plurality of ultra-high melting point refractory ceramic particles compared to a second layer of the plurality of overcoat layers.

8. The method of claim 7, wherein each layer of the plurality of overcoat layers includes a varying volume ratio of the ceramic matrix to the plurality of ultra-high melting point refractory ceramic particles from the surface of the crystallized metal carbide undercoat to a surface of the overcoat.

9. The method of claim 1, wherein applying the mixture to the surface comprises at least one of brush painting the mixture onto the surface or spray painting the mixture onto the surface.

10. The method of claim 1, further comprising:
applying a metal carbide coating to a surface of the plurality of overcoat layers; and
heating the metal carbide coating to form a metal oxide coating.

11. The method of claim 1, wherein forming the overcoat on the surface of the crystallized metal carbide undercoat comprises at least:
applying a first mixture to the surface of the crystallized metal carbide undercoat;
heating the first mixture to the heat treatment temperature to pyrolyze a pre-ceramic polymer of the first mixture and form a first overcoat layer;
applying a second mixture, different from the first mixture, to a surface of the first overcoat layer; and
heating the second mixture to the heat treatment temperature to pyrolyze a pre-ceramic polymer of the second mixture and form a second overcoat layer.

12. The method of claim 1, wherein the ultra-high melting point refractory ceramic particles include at least one of hafnium carbide (HfC), hafnium nitride (HfN), hafnium diboride (HfB$_2$), tantalum carbide (TaC), tantalum diboride (TB$_2$), silicon carbide (SiC), zirconium diboride and silicon carbide (ZrB$_2$—20% SiC), hafnium diboride and silicon carbide (HfB$_2$—20% SiC), hafnium oxide (HfO$_2$), tungsten carbide (WC), or rhenium carbide (ReC).

* * * * *